US010454732B2

(12) United States Patent
Lim et al.

(10) Patent No.: US 10,454,732 B2
(45) Date of Patent: Oct. 22, 2019

(54) METHOD FOR TRANSMITTING PREAMBLE IN WIRELESS LAN SYSTEM

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Wookbong Lee, Seoul (KR); Hangyu Cho, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 15/504,639

(22) PCT Filed: Apr. 7, 2015

(86) PCT No.: PCT/KR2015/003460
§ 371 (c)(1),
(2) Date: Feb. 16, 2017

(87) PCT Pub. No.: WO2016/027956
PCT Pub. Date: Feb. 25, 2016

(65) Prior Publication Data
US 2017/0230217 A1   Aug. 10, 2017

Related U.S. Application Data

(60) Provisional application No. 62/039,923, filed on Aug. 21, 2014.

(51) Int. Cl.
*H04L 27/26* (2006.01)
*H04W 84/12* (2009.01)

(52) U.S. Cl.
CPC ...... *H04L 27/2608* (2013.01); *H04L 27/2602* (2013.01); *H04L 27/2613* (2013.01); *H04W 84/12* (2013.01)

(58) Field of Classification Search
CPC ............ H04L 27/2608; H04L 27/2602; H04L 27/2613
See application file for complete search history.

(56) References Cited

U.S. PATENT DOCUMENTS

2005/0286474 A1* 12/2005 van Zelst ............ H04L 27/2613
370/334
2006/0291583 A1* 12/2006 Hammerschmidt ..... H04B 7/04
375/295
(Continued)

OTHER PUBLICATIONS

U.S. Appl. No. 62/027,425, filed Jul. 2014, Zhang;Hongyuan.*
(Continued)

*Primary Examiner* — Gregory B Sefcheck
*Assistant Examiner* — Jael M Ulysse
(74) *Attorney, Agent, or Firm* — Lee Hong Degerman Kang Waimey (57) ABSTRACT

Disclosed is a method for transmitting a preamble in a wireless LAN system, and a station device for performing the same. To this end, a station for transmitting a preamble configures a wireless frame including a first type terminal frame portion, and a second type terminal frame portion. The first type terminal frame portion includes a first type terminal preamble including a first type terminal short training field (STF) and a first type terminal long training field (LTF), and the second type terminal frame portion includes a second type terminal preamble including a second type terminal SFT and a second type terminal LTF. Here, the station configures the second type terminal preamble by allocating sequence components at an interval of an integer number of tones in a frequency domain and transmits the configured wireless frame to another station.

8 Claims, 8 Drawing Sheets

(56) References Cited

U.S. PATENT DOCUMENTS

| | | | |
|---|---|---|---|
| 2009/0285240 A1* | 11/2009 | Zhang | H04J 13/0014 370/476 |
| 2010/0061402 A1* | 3/2010 | van Zelst | H04L 5/0023 370/474 |
| 2011/0194544 A1* | 8/2011 | Yang | H04L 27/2613 370/338 |
| 2011/0255620 A1* | 10/2011 | Jones, IV | H04L 5/0046 375/260 |
| 2011/0299382 A1* | 12/2011 | Van Nee | H04L 27/2613 370/210 |
| 2011/0305296 A1* | 12/2011 | Van Nee | H04L 5/0053 375/295 |
| 2012/0002756 A1* | 1/2012 | Zhang | H04L 5/0048 375/308 |
| 2012/0169125 A1 | 7/2012 | Bobb et al. | |
| 2012/0201316 A1* | 8/2012 | Zhang | H04L 1/0046 375/260 |
| 2012/0269125 A1* | 10/2012 | Porat | H04W 72/1231 370/328 |
| 2012/0294294 A1* | 11/2012 | Zhang | H04L 1/0025 370/338 |
| 2012/0324315 A1* | 12/2012 | Zhang | H04L 1/004 714/776 |
| 2013/0107893 A1* | 5/2013 | Zhang | H04L 1/00 370/474 |
| 2013/0107981 A1* | 5/2013 | Sampath | H04L 25/0232 375/295 |
| 2013/0121348 A1* | 5/2013 | Zhang | H04L 29/06 370/474 |
| 2013/0177090 A1* | 7/2013 | Yang | H04L 41/16 375/260 |
| 2013/0215993 A1* | 8/2013 | Taghavi Nasrabadi | H04L 27/2615 375/295 |
| 2013/0216002 A1* | 8/2013 | Suh | H04L 27/2613 375/308 |
| 2013/0230120 A1* | 9/2013 | Yang | H04L 27/2613 375/295 |
| 2013/0272282 A1* | 10/2013 | Baik | H04W 84/12 370/338 |
| 2014/0071996 A1* | 3/2014 | Tetzlaff | H04L 1/0031 370/474 |
| 2014/0079145 A1* | 3/2014 | Sampath | H04B 7/0811 375/260 |
| 2015/0131756 A1* | 5/2015 | Suh | H04L 27/2602 375/295 |
| 2015/0146808 A1* | 5/2015 | Chu | H04L 5/0037 375/260 |
| 2015/0349995 A1* | 12/2015 | Zhang | H04L 5/0048 375/295 |

OTHER PUBLICATIONS

U.S. Appl. No. 62/006,522, filed Jun. 2014, Zhang;Hongyuan.*
PCT International Application No. PCT/KR2015/003460, Written Opinion of the International Searching Authority dated Jul. 14, 2015, 24 pages.

* cited by examiner

Fig. 12

METHOD FOR TRANSMITTING PREAMBLE IN WIRELESS LAN SYSTEM

CROSS-REFERENCE TO RELATED APPLICATIONS

This application is the National Stage filing under 35 U.S.C. 371 of International Application No. PCT/KR2015/003460, filed on Apr. 7, 2015, which claims the benefit of U.S. Provisional Application No. 62/039,923, filed on Aug. 21, 2014, the contents of which are all hereby incorporated by reference herein in their entirety.

TECHNICAL FIELD

The present invention relates to a wireless communication system, and more particularly, to a method for transmitting a preamble in a wireless local area network (WLAN) system and station device for performing the method.

BACKGROUND ART

First of all, a wireless local area network (WLAN) system is described as an example of a system to which the present invention can be applied.

Standards for a wireless local area network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying orthogonal frequency division multiplexing (OFDM) at 2.4 GHz. IEEE 802.11n provides a transmission rate of 300 Mbps for four spatial streams by applying multiple input multiple output (MIMO)-01-DM. In IEEE 802.11n, a channel bandwidth is supported up to 40 MHz and in this case, a transmission rate of 600 Mbps is provided.

The above-described WLAN standards have evolved into IEEE 802.11ac standards that provides a bandwidth of up to 160 MHz and a transmission rate of up to 1 Gbit/s by supporting eight spatial streams. Currently, IEEE 802.11ax standards are under discussion.

DISCLOSURE OF THE INVENTION

Technical Task

In the above-mentioned IEEE 802.11 ax standards, a new frame structure is under discussion to implement high-speed wireless communication in a high-density wireless environment.

In particular, since in the new frame structure, a frame portion for a legacy terminal coexists with a frame portion for a terminal supporting IEEE 802.11ax, additional discussion on how to configure and transmit a preamble for the UE supporting IEEE 802.11ax is required.

Technical Solutions

In a one aspect of the present invention, provided is a method for transmitting a preamble by a first station in a wireless local area network (WLAN) system, including: configuring a radio frame including a frame portion for a first type of terminal, which has a first length in a time domain, and a frame portion for a second type of terminal, which has a second length corresponding to an integer multiple of the first length; and, wherein the frame portion for the first type of terminal may include a preamble for the first type of terminal including a short training field (STF) for the first type of terminal and a long training field (LTF) for the first type of terminal, wherein the frame portion for the second type of terminal may include a preamble for the second type of terminal including an STF for the second type of terminal and an LTF for the second type of terminal, and wherein the preamble for the second type of terminal may be configured by assigning a sequence component at an interval corresponding to an integer number of tones in a frequency domain, transmitting the configured radio frame to a second station.

In another aspect of the present invention, provided is a station device operating as a first station in a wireless local area network (WLAN) system, including: a processor configured to configure a radio frame including a frame portion for a first type of terminal, which has a first length in a time domain, and a frame portion for a second type of terminal, which has a second length corresponding to an integer multiple of the first length; and a transceiver unit configured to be connected to the processor and transmit, to a second station, the radio frame configured by the processor, wherein the frame portion for the first type of terminal may include a preamble for the first type of terminal including a short training field (STF) for the first type of terminal and a long training field (LTF) for the first type of terminal, wherein the frame portion for the second type of terminal may include a preamble for the second type of terminal including an STF for the second type of terminal and an LTF for the second type of terminal, and wherein the processor may configure the preamble for the second type of terminal by assigning a sequence component at an interval corresponding to an integer number of tones in a frequency domain.

Advantageous Effects

According to the present invention, it is possible to operate a frame that not only allows high-efficiency wireless communication but also minimize effects on existing standard technology.

Specifically, if a frame portion in accordance with the newly defined WLAN standards has a length greater by an integer multiple than that of a frame portion for a legacy terminal, it is possible to minimize overhead in terms of time depending on a length of the long-time domain and optimize the use of tones in terms of frequency.

In addition, OFDMA and UL-MU MIMO can be supported based on the newly defined standards

BEST MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

The following description relates to a method for transmitting a preamble in a WLAN system and station device for performing the method. To this end, a WLAN system to which the present invention is applied will be explained in detail.

Figure 1:
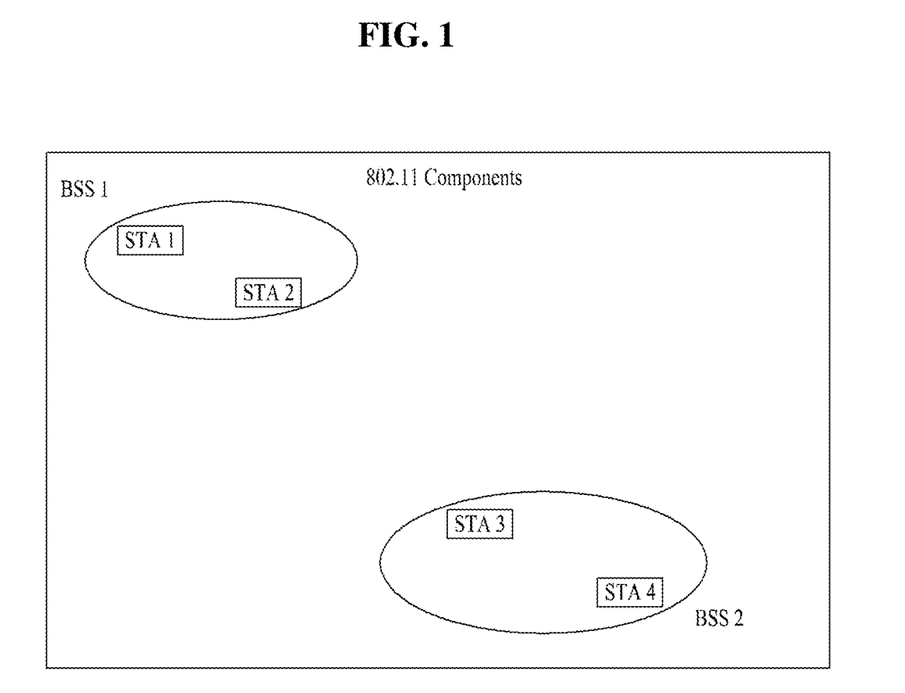
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
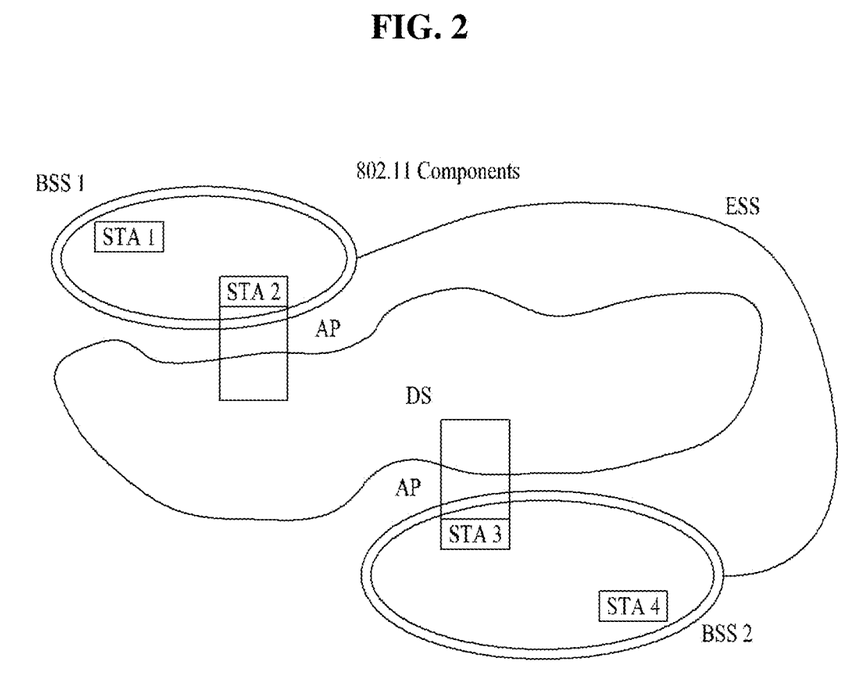
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above discussion, a frame structure that can be used in the WLAN system will be described.

Figure 3:
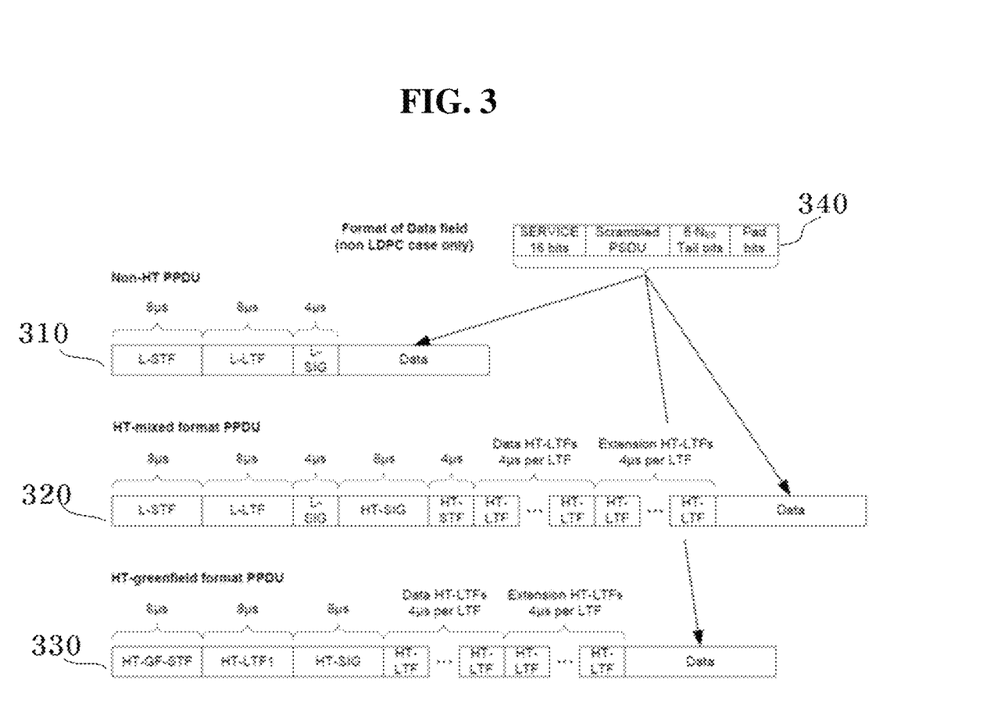
FIG. 3 is a diagram for explaining a frame structure that can be used in a WLAN system.

FIG. 3 is a diagram for explaining the frame structure that can be used in the WLAN system.

Specifically, in FIG. 3, reference numeral 310 denotes a physical layer protocol data unit (PPDU) format for a terminal in accordance with IEEE 802.11a/g standards and reference numerals 320 and 330 denote PPDU formats for a terminal in accordance with IEEE 802.11n standards. As shown in FIG. 3, a terminal supporting IEEE 802.11n schemes uses frames denoted by a prefix of "HT-".

More specifically, the reference numeral 320 denotes an HT-mixed format PPDU of the IEEE 802.11n terminal and the reference numeral 330 denotes an HT-greenfield format PPDU of the IEEE 802.11n terminal.

In addition, reference numeral 340 denotes a configuration of data in each PPDU and a physical service data unit (PSDU) is included in a data region.

Figure 4:
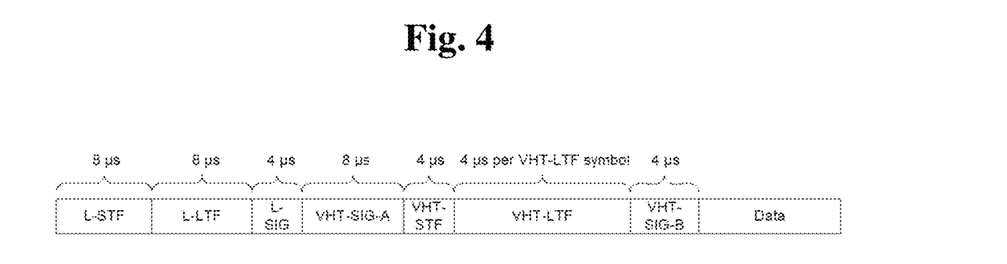
FIG. 4 illustrates a frame format according to an IEEE 802.11ac standard technology.

FIG. 4 illustrates the frame format according to the IEEE 802.11ac standard technology.

As shown in FIG. 4, a terminal in accordance with IEEE 802.11ac standards supports fields denoted by a prefix of "VHT-".

Table 4 shows individual fields shown in FIG. 4.

TABLE 1

| Field | Description |
| --- | --- |
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |
| Data | The Data field carries the PSDU(s) |

Figure 5:
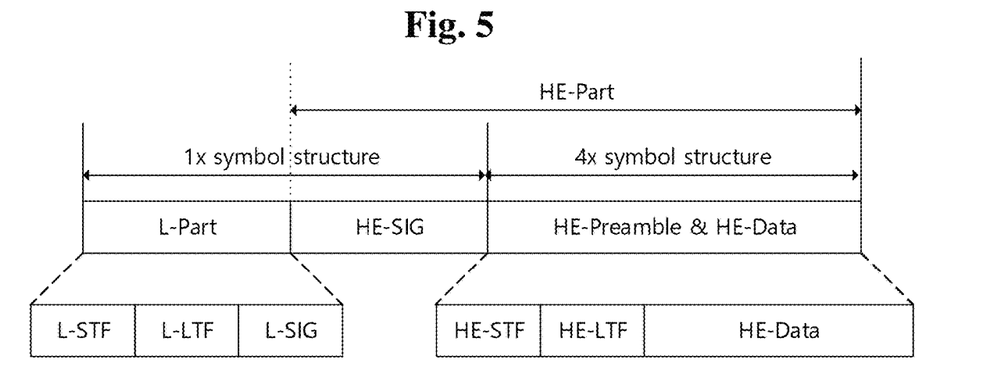
FIG. 5 is a diagram illustrating a frame format available in a new standards as an embodiment of the present invention.

FIG. 5 is a diagram illustrating a frame format available in a new standards as an embodiment of the present invention.

In FIG. 5, "L-Part" indicates a frame portion for a legacy terminal (i.e., a frame portion for a first type of terminal), and "HE-Part" indicates a frame portion for a terminal in accordance with an enhanced standard technology (e.g., IEEE 802.11ax) (i.e., a frame portion for a second type of terminal). In this case, it is preferred that the frame portion in accordance with the new standards has a length greater by an integer multiple than that of the frame portion for the legacy terminal in a time domain. FIG. 5 shows an example of the frame structure in the 802.11ax where a conventional 1× symbol structure (i.e., 3.2 us) is maintained until an HE-SIG, whereas a 4× symbol structure (i.e., 12.8 us) is used for an HE-preamble and data.

In the case of the "L-Part" in the example of FIG. 5, an L-STF, L-LTF, and L-SIG can be maintained similar to a configuration of the conventional Wi-Fi system as illustrated in FIG. 3 and FIG. 4.

The newly defined HE-SIG in the HE-Part may have fields for indicating common control information and user-specific information. As illustrated in FIG. 5, the 1× symbol structure is used in the HE-SIG similar to the L-Part. On the other hand, since the 4× symbol structure is used in the HE-preamble and data, a frequency tone (FT) that can be used per bandwidth is increased by four times compared to the conventional Wi-Fi system. In addition, the number of available tones may also be changed. Therefore, the HE-preamble (HE-STF and HE-LTF) can be newly designed to support the increased FT and the changed available tones.

Hereinafter, a description will be given of a method for minimizing overhead in terms of time due to the 4× longer symbol structure and optimizing the use of tones in terms of frequency in implementing the above-described design. In addition, a method for supporting OFDMA and UL-MU MIMO based on a newly defined standards (11ax) is also proposed.

Further, a method for configuring and transmitting an HE-preamble (HE-STF and HE-LTF) based on a newly defined standards (11ax) and device for the same will be hereinafter described. In the following description, it is assumed that the 4× symbol structure is used in HE-Preamble Part.

Reuse of IEEE 802.11ac Structure

First, in an embodiment of the present invention, it is possible to design a 4× tone structure per bandwidth to comply with an existing tone structure of 4× bandwidth.

In the 11ax, a signal can be transmitted using a bandwidth of 20, 40, 80, or 160 MHz and in this case, the number of total tones (i.e., FFT size) in accordance with the 4× symbol structure may be one of 256, 512, 1024, and 2048. Thus, at 20 MHz and 40 MHz, the 11ax may use a tone structure (allocation) used at 80 MHz (256 FFT) and 160 MHz (512 FFT) in the conventional 11ac, which has the same tone numbers (i.e., FFT sizes) as those at 20 MHz and 40 MHz in the 11ax. Moreover, for an HE-STF and HE-LTF constituting an HE-preamble, the 11ax may use a VHT-STF and VHT-LTF used at 80 MHz and 160 MHz in the 11ac.

In addition, for 1024 and 2048 FFT sizes which have not been defined in the related art, the 11ax may use 512 FFT (160 MHz) in the 11ac. For instance, it is possible to implement a method of using two segments (256 FFT, 80 MHz) consecutively by considering 80 MHz (256 FFT) as a single segment. That is, by considering subordinate 40 MHz (512 FFT structure) and 80 MHz (1024 FFT structure) as one segment, segments may be consecutively used. In other words, tone allocation for 40 MHz is linearly extended so that it can be used for a tone structure for 80 MHz in the 11ax (it is equal to tone allocation for 160 MHz in the 11ac) and this may be equally applied to 160 MHz.

Accordingly, HE-STFs and HE-LTFs used in 512 FFT and 1024 FFT are linearly extended so that they can be used for HE-STFs and HE-LTFs for 1024 FFT and 2048 FFT, respectively.

As a particular example, HE-STFs and HE-LTFs at 40/80 MHz can be configured as follows.

HE-STF(40 MHz)=VHT_STF(160 Mhz)=VHTS-250 250={VHTS-122 122 0 0 0 0 0 0 0 0 0 0 VHTS-122 122}     [Equation 1]

HE-LTF(40 MHz)=VHT_LTF(160 Mhz)=VHTLTF-250 250={VHTLTF-122 122 0 0 0 0 0 0 0 0 0 0 VHTLTF-122 122}     [Equation 2]

HE-STF(80 MHz)={HE-STF(40 MHz) 0 0 0 0 0 0 0 0 0 0 HE-STF(40 MHz)}     [Equation 3]

HE-LTF(80 MHz)={HE-LTF(40 MHz) 0 0 0 0 0 0 0 0 0 0 HE-LTF(40 MHz)}     [Equation 4]

The above relationships can be defined as shown in Table 2.

TABLE 2

| | Bandwidth | | | |
| --- | --- | --- | --- | --- |
| | 20 MHz | 40 MHz | 80 MHz | 160 MHz |
| The number of total tones (1x) | 64 | 128 | 256 | 512 |
| The number of available tones (1x) | 56 | 114 | 242 | 484 |
| The number of total tones (4x) | 256 | 512 | 1024 | 2048 |
| The number of available tones (4x) | 242 | 484 | 968 | 1936 |

Use of Structure Different from that of IEEE 802.11ac

In another embodiment of the present invention, it is possible to design the 4× tone structure per bandwidth to be different from the existing tone structure of 4× bandwidth.

In the 11ax, different tone allocation can be used for efficient use of a 4× frame format. That is, different numbers of DC tones and guard tones may be used in a 4× frame structure and thus, the number of available tones per bandwidth may also be changed. Therefore, the HE-preamble (HE-STF and HE-LTF) may have a different length depending on the number of DC tones per BW and the number of guard tones per BW as shown in Table 3.

TABLE 3

| 20 MHz (256 FFT size) | A. The number of DC tones = 3 & the number of guard tones = 13 |
| --- | --- |
| | B. The number of DC tones = 3 & the number of guard tones = 17 |
| | C. The number of DC tones = 5 & the number of guard tones = 11 |
| | D. The number of DC tones = 9 & the number of guard tones = 11 |
| 40 MHz | A. The number of DC tones = 3 & the number of guard tones = 13 |
| | B. The number of DC tones = 3 & the number of guard tones = 19 |
| | C. The number of DC tones = 5 & the number of guard tones = 11 |
| | D. The number of DC tones = 11 & the number of guard tones = 11 |

TABLE 3-continued

| 80 MHz | A. The number of DC tones = 3 & the number of guard tones = 11 |
| --- | --- |
| | B. The number of DC tones = 3 & the number of guard tones = 13 |
| | C. The number of DC tones = 5 & the number of guard tones = 11 |

In this situation, although the VHT-STF and VHT-LTF per BW defined in the 11ac may be used for the HE-STF and HE-LTF, it is also possible to design a new modified HE-LTF and HE-STF in consideration of the number of DC tones and the number of guard tones. On the other hand, sequences different from those defined in the 11ac may be used.

The sequences for the newly designed HE-STF and HE-LTF may be orthogonal to each other. In addition, the sequences may be designed as one sequence in consideration of PAPR and used with a matrix for distinguishing between STAs/streams (e.g., P matrix of the 11ac).

First, by linearly repeating the VHT-STF and/or the VHT-LTF per BW defined in the 11ac in the available tones, the HE-STF and/or HE-LTF can be defined as follows.

(1) HE-STF:

The HE-STF may be configured such that $S_{-26,26} = \sqrt{1/2}$ {0, 0, 1+j, 0, 0, 0, -1-j, 0, 0, 0, 1+j, 0, 0, 0, -1-j, 0, 0, 0, -1-j, 0, 0, 0, 1+j, 0, 0, 0, 0, 0, 0, -1-j, 0, 0, 0, -1-j, 0, 0, 0, 1+j, 0, 0, 0, 1+j, 0, 0, 0, 1+j, 0, 0, 0, 1+j, 0, 0} is repeated at the center of DC and 0 is assigned to the remaining tones.

(2) HE-LTF:

The HE-LTF may be configured such that $LTF_{left}$={1, 1, -1, -1, 1, 1, -1, 1, -1, 1, 1, 1, 1, 1, 1, -1, -1, 1, 1, -1, 1, -1, 1, 1, 1, 1} and $LTF_{right}$={-1, -1, -1, 1, 1, -1, 1, -1, 1, -1, -1, -1, -1, -1, 1, -1, 1, -1, 1, 1, 1} are repeated at the center of DC and 1 and -1 are assigned to the remaining tones.

The above HE-LTF can be used with P matrix of the 11ac in Equation 5 below to distinguish between STAs/streams.

$$V = \left[\prod_{i=1}^{min(N_c,N_r-1)} \left[D_i(1_{i-1} e^{j\phi_{i,i}} \ldots e^{j\phi_{N_r-1,i}} 1) \prod_{l=i+1}^{N_r} G_{li}^T(\psi_{li})\right]\right] \tilde{I}_{N_r} \times N_c$$ [Equation 5]

In Equation 5, if $1_{i-1}$ is a matrix of 1 with a length of i-1, an Nr by Nr diagonal matrix, D matrix can be defined as follows.

$$D(1_{i-1} e^{j\phi_{i,i}} \ldots e^{j\phi_{N_r-1,i}} 1) = \begin{bmatrix} I_{i-1} & 0 & \ldots & \ldots & 0 \\ 0 & e^{j\phi_{i,i}} & 0 & \ldots & 0 \\ \vdots & 0 & \ddots & 0 & 0 \\ \vdots & \vdots & 0 & e^{j\phi_{N_r-1,i}} & 0 \\ 0 & 0 & 0 & 0 & 1 \end{bmatrix}$$

In addition, in Equation 5, G matrix is an Nr by Nr rotation matrix and it can be defined as follows.

$$G_{li}(\psi) = \begin{bmatrix} I_{i-1} & 0 & 0 & 0 & 0 \\ 0 & \cos(\psi) & 0 & \sin(\psi) & 0 \\ 0 & 0 & I_{l-i-1} & 0 & 0 \\ 0 & -\sin(\psi) & 0 & \cos(\psi) & 0 \\ 0 & 0 & 0 & 0 & I_{N_r-l} \end{bmatrix}$$ [Equation 7]

As described above, in designing the HE-STF and HE-LTF, the VHT-STF and VHT-LTF of the 11ac, which have the same FFT size, can be used. In this case, in the previously configured STF and LTF, signals in the parts corresponding to differences between DC tones and guard tones may not be used.

That is, in the VHT-STF and VHT-LTF of the 11ac, which include DC, signals as many as half of a difference between the number of DC tones at the left side and the number of DC tones at the right side with respect to the DC are set to 0 (or not to be used) and signals as many as half of a difference between guard tones at both ends of the sequence may be set to 0 (or not to be used).

Meanwhile, in the case of simple extension using 80 MHz (256 FFT) and 160 MHz (512 FFT) as described above, it has a disadvantage in that as the number of available tones decreases, tone efficiency is reduced. Thus, to increase efficiency in a BW greater than 40 MHz (e.g., 80 MHz, 160 MHz, etc.), the STF can be configured according to the following methods.

B-1. Sequence Assignment at Interval of Integer Multiple of Tone in Frequency Domain FIG. 6 is a diagram for explaining a method for configuring a new preamble for the WLAN according to a preferred embodiment of the present invention.

In the present embodiment, it is proposed that an HE-preamble is configured by assigning a sequence component at an interval of an integer multiple of tones in a frequency domain to improve tone efficiency.

Figure 6:
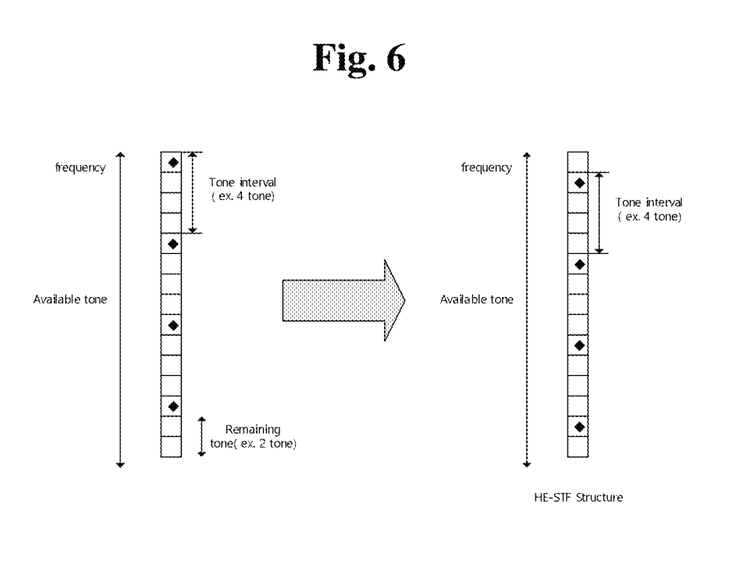
FIG. 6 is a diagram for explaining a method for configuring a new preamble for a WLAN according to a preferred embodiment of the present invention.

Specifically, FIG. 6 shows that in designing an HE-STF with a larger FFT size (e.g., 512, 1024, 2048, etc.), the 11ac STF sequence of a QPSK signal is assigned within available tones except DC and guard tones at an interval of four tones and 0 is assigned to the remaining tones.

In this case, if the number of the available tones is not an integer multiple of four, for instance, in case of the number of the available tones % 4=2, the STF may be configured as shown in FIG. 6, by considering the remaining two tones. That is, the remaining two tones may be set to 0 and then located at both ends.

When an OFDMA scheme is applied to a newly defined WLAN standards (e.g., 11ax), the aforementioned method can be utilized as follows.

Specifically, when a first station (STA 1) uses a specific region assigned within the frequency domain, the STA 1 may configure the STF based on the number of tones included in the assigned region according to the aforementioned method.

For large FFT sizes (e.g., 512, 1024, 2048, etc.), an LTF may be designed using a sequence with the same length as the number of the available tones except the DC and guard tones. In this case, as the above sequence, an orthogonal sequence or a sequence for decreasing PAPR may be used. In addition, it is also possible to use a sequence with low PAPR among sequences obtained by extending a predefined LTF sequence.

C. Sequence Assignment at Interval of Integer Multiple of Tone in Frequency Domain 2

In case of a long symbol structure (e.g., a structure with 4× symbols), if all tones are used in the conventional manner, it may cause an overhead issue. Thus, an HE-STF and HE-LTF in a 4× frame structure may be configured such that the HE-STF and HE-LTF are transmitted at a prescribed tone interval instead of using all tones (i.e., available tones) per BW for transmission of the HE-STF and HE-LTF.

Figure 7:
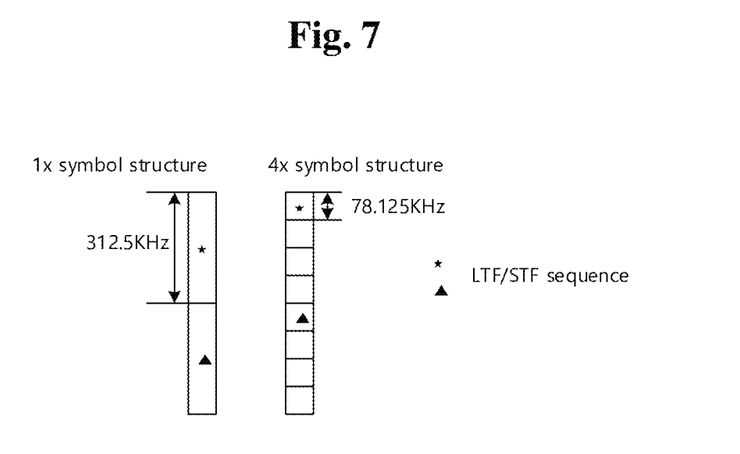
FIG. 7 is a diagram for explaining a method for configuring a sequence by assigning the sequence at a predetermined tone interval according to a preferred embodiment of the present invention.

FIG. 7 is a diagram for explaining a method for configuring a sequence by assigning the sequence at a predetermined tone interval according to a preferred embodiment of the present invention.

In FIG. 7, * ▲ mean signals mapped to respective tones in the HE-STF and HE-LTF. For instance, if the HE-LTF has a sequence of 1, 2, . . . , * ▲ may respectively mean 1 and 2, each of which corresponds to a component mapped to each tone.

The 4× structure has a subcarrier frequency spacing (i.e., a tone interval=78.125 KHz) smaller by four times than a subcarrier frequency spacing (i.e., 312.5 KHz) in the 11ac as shown in FIG. 7. In addition, since in an indoor channel environment, a coherent BW is greater than the subcarrier frequency spacing of the 11ac, it is proposed that the HE-STF and HE-LTF according to the present embodiment have a structure in which a signal is loaded at an interval equal to the subcarrier frequency spacing of the 11ac, i.e., a structure in which a signal is loaded at an interval of four tones (i.e., 4×78.125 KHz) in the 4× symbol structure.

Although FIG. 7 shows an example in which the sequence is assigned at the interval of four tones, this is merely an example and the sequence may be assigned at an interval of an integer multiple of tones, which is selected according to system conditions.

In addition, in a preferred embodiment of the present invention, it is proposed to transmit the HE-STF and HE-LTF assigned as described above by boosting transmission power of the HE-STF and HE-LTF. In this case, transmission power boosting may be determined by considering the number of unused tones. For instance, if an interval of tones where signals are loaded (i.e., frequency interval) is two tones (i.e., 2×78.125 KHz), power as much as in two tones can be allocated to one tone. Thus, the transmitted preamble may be power-boosted by about 1.5 dB and such a relationship can be summarized as shown in Table 4.

TABLE 4

| | Tone interval (frequency spacing) | | | |
|---|---|---|---|---|
| | 1 (78.125 KHz) | 2 (2 × 78.125 KHz) | 3 (3 × 78.125 KHz) | 4 (4 × 78.125 KHz) |
| Boosting (dB) | 1 dB | 1.5 dB | 2.4 dB | 3 dB |

Although Table 4 shows boosting until the four-tone interval, the aforementioned method can be applied when the tone interval increases.

Figure 8:
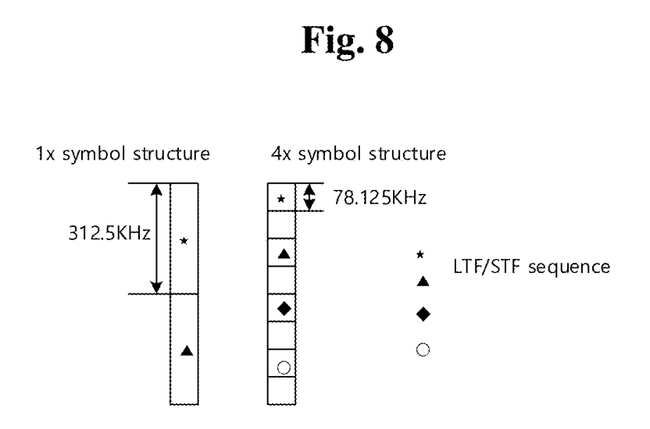
FIG. 8 is a diagram for explaining a method for configuring a sequence by assigning the sequence at a predetermined tone interval according to another embodiment of the present invention.

FIG. 8 is a diagram for explaining a method for configuring a sequence by assigning the sequence at a predetermined tone interval according to another embodiment of the present invention.

In FIG. 8, * ▲ ♦ ○ mean signals mapped to respective tones in the HE-STF and HE-LTF. For instance, if the HE-LTF has a sequence of 1, 2, 3, 4, . . . , * ▲ ♦ ○ may respectively mean 1, 2, 3, and 4, each of which corresponds to a component mapped to each tone.

In the 11ax, not only an indoor environment but also an outdoor environment need to be supported. Considering an outdoor speed (3 Km/h) and delay spread in a channel (UMi) supported by the 11ax, a coherent BW (90%) is estimated as about 155 KHz. Thus, in a two-tone interval (2×78.125 KHz), since channels are stable in terms of frequency, the HE-LTF and HE-STF may has a structure in which the HE-LTF and HE-STF are loaded at the two-tone interval as shown in FIG. 8. In this case, the power boosting may be performed on the HE-STF and HE-LTF according to the aforementioned method.

Figure 9:
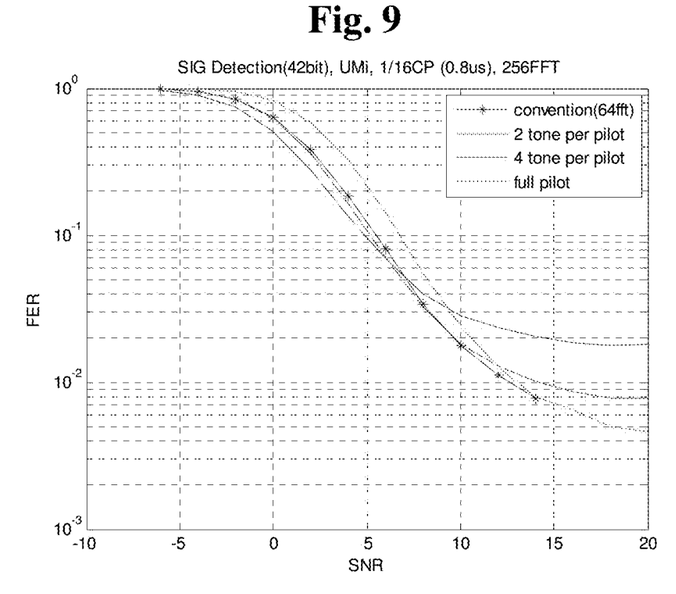
FIG. 9 is a diagram for explaining performance improvement when an HE-STF and HE-LTF are configured as shown in FIG. 7 and FIG. 8.

FIG. 9 is a diagram for explaining performance improvement when the HE-STF and HE-LTF are configured as shown in FIG. 7 and FIG. 8.

Referring to the performance result in the graph of FIG. 9, when the two-tone interval is used in outdoor, it can be seen that in the case of the 4× symbol structure, overhead is reduced and performance is maintained as the same as that in the related art (11ac).

Although FIG. 9 shows an example in which a sequence is assigned at two-tone and four-tone intervals, the HE-LTF and HE-STF can be configured using a three-tone interval and in this case, loaded signals can also be power-boosted with reference to Table 4.

C-1. Application of Different Configurations of HE-STF and HE-LTF

In an embodiment of the present invention, the HE-STF and HE-LTF may be configured to use different lengths of signals or have different tone allocation intervals. For instance, if the number of available tones is 242 at 20 MHz, the HE-STF may be configured to have a 242-length to cover all tones but the HE-LTF may be configured such that the HE-LTF is loaded at the two-tone interval or the four-tone interval as mentioned above. Thus, the HE-STF and HE-LTF may have different lengths.

D. Case in which OFDMA is Applied

In case signals are transmitted only in a partial resource region allocated per user/STA based on the OFDMA (i.e., DL/UL), it is possible to use the HE-STF and HE-LTF configured in each bandwidth as described in the aforementioned embodiments or design a new HE-STF and HE-LTF corresponding to the allocated resource region.

An STA may transmit signals corresponding to the allocated resource region in the HE-STF and HE-LTF according to the bandwidth designed as described above, i.e., the STA may transmit only the corresponding parts in the HE-STF and HE-LTF by mapping the corresponding parts to the allocated resources. For instance, if a total 20 MHz of a system BW is ideally allocated to eight users/STAs by being divided into 2.5 MHz based on UL OFDMA, each of the eight users/STAs may be allocated 32 tones with reference to 256 tones. In this case, the above-mentioned HE-STF and HE-LTF may be configured using partial sequences of existing HE-STF and HE-LTF sequences, which are mapped to the corresponding resource region.

On the other hand, the user/STA may configure the HE-STF and HE-LTF corresponding to the allocated resource region using STF and LTF sequences of the 11ac.

In the 11ac, a 20 MHz (64 FFT) sequence can be used to generate an STF for a large system BW. Similarly, in the 11ax, it is possible to configure and use an STF for a region corresponding to allocated resources using the signal. For instance, if 2.5 MHz is ideally allocated to eight users/STAs, each of the eight users/STAs may be allocated 32 tones with reference to 256 tones. Thus, in this case, the HE-STF may be configured using the left sequence, $(S_{-26,-1})$ of $S_{-26,26}$ or the right sequence, $(S_{1,26})$ of $S_{-26,26}$.

$$S_{-26,26} = \sqrt{1/2}\{0,0,1+j,0,0,0,-1-j,0,0,0,1+j,0,0,0,-1-j,0,0,0,-1 \\ -j,0,0,0,1+j,0,0,0,0,0,0,-1-j,0,0,0,-1-j,0,0,0, \\ 1+j,0,0,0,1+j,0,0,0,1+j,0,0,0,1+j,0,0\} \quad \text{[Equation 8]}$$

For a small allocated region, a corresponding sequence may be configured by linearly decreasing the left/right sequences. In addition, sequences for different lengths of resource regions may also be configured through a combination of the left/right sequences.

Regarding the LTF, it is possible to configure and use an HE-LTF for the allocated resources using an 11ac LTF sequence/11ah LTF sequence similar to the HE-STF configuration method.

11ac:

$$LTF_{left} = \{(1,1,-1,-1,1,1,-1,1,-1,1,1,1,1,1,1,1,-1,-1,1, \\ 1,-1,1,-1,1,1,1,1\}$$

$$LTF_{right} = \{1,-1,-1,1,1,-1,1,-1,1,-1,-1,-1,-1,-1,1,1,- \\ 1,-1,1,-1,1,-1,1,1,1,1\}$$

11ah:

$$LTF_{-16:15} = \{0,0,0,1,-1,1,-1,1,-1,1,1,1,-1,1,1,1,0,- \\ 1,-1,-1,1,-1,-1,1,1,-1,1,1,1,-1,0,0\} \quad \text{[Equation 9]}$$

The HE-LTF may be transmitted by being multiplied with the P matrix defined in the 11ac to distinguish between STAs/streams as described above.

When a signal is transmitted through a resource/resource combination allocated to an STA/user using the OFDMA, the STF/LTF can be transmitted using the following methods.

In the OFDMA, the STF/LTF may be configured and used according to a basic resource tone (BRT) allocated per STA/user. For example, in case the OFDMA is used in 20 MHz BW (256 FFT), if sizes (frequency) of an available BRT are 13, 26 and 56 tones, the STF and LTF may be configured with sequences corresponding to the BRT sizes according to the proposed various methods. The STA/user may transmit the HE-STF and HE-LTF using STF/LTF sequences corresponding to the allocated resource sizes.

Regarding a combination of BRTs available per BW, STF/LTF sequences with corresponding sizes may be configured and used.

Meanwhile, when two or more BRTs are allocated to the SAT/user, the STF/LTF can be transmitted as follows.

According to an embodiment of the present invention, it is possible to attach corresponding STF/LTF sequences to the BRT sizes corresponding to the allocated resource region and then use the STF/LTF sequences. For instance, if an STA uses two BRTS, BRT1 (26 tones) and BRT2 (56 tones), the STA may use a sequence (S_26) for the BRT1 and a sequence (S_56) for the BRT2 according to an order of BRTS, linearly and consecutively. That is, for the allocated resource region, the STF/LTF may be set as [S_26 S_56].

If two or more BRTS having the same size are allocated, it is possible to repeatedly use STF/LTF sequences associated with one BRT.

In the case of DL, an AP/STA may transmit signals using the HE-STF and HE-LTF configured in each BW. In addition, the SAT may receive only data corresponding to the allocated partial resources or use signals associated with the allocated resources after receiving entire data. The HE-LTF and HE-STF may be transmitted by being multiplied with the P matrix defined in the 11ac to distinguish between STAs/streams as described above.

Hereinafter, an HE-STF transmission method and an HE-LTF method will be separately described with reference to particular examples.

HE-STF

In a preferred embodiment of the present invention, it is proposed that an HE-STF is configured as an STF signal for each user and then transmitted at an interval of four tones.

Figure 10:
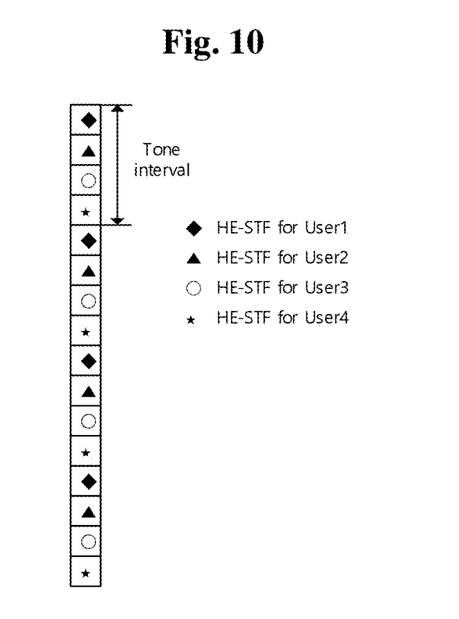
FIG. 10 is a diagram for explaining a method of transmitting HE-STFs for individual users by assigning the HE-STFs at an interval of four tones according to an embodiment of the present invention.

FIG. 10 is a diagram for explaining a method of transmitting HE-STFs for individual users by assigning the HE-STFs at the four-tone interval according to the embodiment of the present invention.

According to the present embodiment, the STF signal is loaded at the four-tone interval and different STF signals for different users are loaded in the remaining tones of each interval. Thus, all tones may be occupied with STF signals. According to the above-mentioned HE-STF transmission method, when STA/users simultaneously transmit signals using a transmission method such as the MU-MIMO, a receiving side can perform AGC within a permitted range of AGC per STA/user using the HE-STF.

The HE-STF allocated to each user may be the VHT-STF defined in the 11ac or a newly designed one. The STA/user may use a common STF or a dedicated STF. The newly designed HE-STF may be configured with orthogonal sequences.

The STA/user can obtain tone allocation/transmission location information for HE-STF transmission as follows.

HE-STFs may be sequentially transmitted according to user/STA ordering. For instance, if STA 1 is third in the ordering, the STA 1 may transmit the HE-STF using the third tone of FIG. 10, which is denoted as "O". For example, in case of transmission of AP-triggered UL data, UL MU MIMO/OFDMA data may be allocated as shown in FIG. 10 and then transmitted according to UL MU user/STA ordering, which are indicated through a triggered frame.

On the other hand, different from the above-described method, allocation information for HE-STF transmission per user/STA may be configured to be received through a control frame/management frame/trigger frame/MAC header. The received information may include a start point, a tone interval, an offset, an end point, etc.

HE-STF sequences for each STA/user can be assigned according to the following methods.

The HE-STF sequences may be assigned based on user/STA ordering. That is, the user/STA may sequentially select the HE-STF sequences from a set of 11ax HE-STF sequences according to a numerical order, which is made for signal transmission, and then use the selected HE-STF sequences.

On the other hand, each user/STA may receive information on HE-STF sequences assigned to the corresponding user/STA through the control frame/management frame/ trigger frame/MAC header. In this case, the received information may include a sequence index, a shifting index, a root index, a basic sequence, etc.

Meanwhile, according to another embodiment of the present invention, unlike FIG. 10, two or more STAs/users may transmit HE-STFs through a single tone. In this case, STAs/users that transmit HE-STFs at the same position may transmit the same HE-STF sequences. Alternatively, when the STAs/users transmit different sequences, the HE-STFs can be distinguished through CDM.

Meanwhile, when STAs/users use the same tone, they may be distinguished through TDM. For instance, in the structure shown in FIG. 10, if eight STAs transmit HE-STFs, four STAs use a first HE-STF symbol and the other four STAs use a second HE-STF symbol for transmission.

The aforementioned method can be applied when two, three, or eight tones are used rather than four tones.

The tone interval of the HE-STF sequence or the HE-STF sequence assignment method can be changed depending on whether UL-MU is applied or according to the number of applied users. In addition, this may be signaled to users (e.g., through an HE-SIG).

The HE-STF and HE-LTF may be transmitted for the entire system BW. Alternatively, they may be transmitted to each user for only a resource region where each user's data is transmitted.

HE-LTF

In an embodiment of the present invention, the structure where the HE-LTF is loaded at the two-tone interval will be explained in detail.

Figure 11:
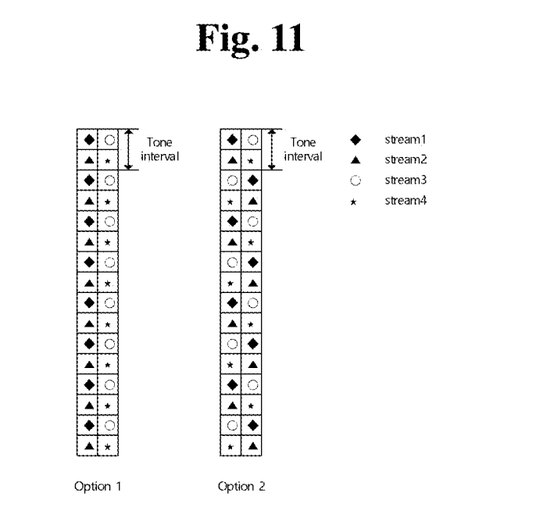
FIG. 11 is a diagram for explaining a method of transmitting HE-LTFs for individual users by assigning the HE-LTFs at an interval of two tones according to an embodiment of the present invention.

FIG. 11 is a diagram for explaining a method of transmitting HE-LTFs for individual users by assigning the HE-LTFs at the two-tone interval according to the embodiment of the present invention.

<Option 1>

An HE-LTF for one stream/user is loaded at every two-tone interval and an HE-LTF for another stream/user is loaded at the other tone of every two-tone interval. Thus, the HE-LTFs for two streams/users can be transmitted in each OFDM/A symbol.

In the 11ac, LTF symbols has been assigned depending on the number of streams/users, for example, 1 stream—1 LTF symbol, 2 streams—2 LTF symbols, 3 streams—4 LTF symbols, 4 streams—4 LTF symbols. However, in the 11ax, since the number of symbols is reduced by half due to use of the method described in the option 1 compared to that in the 11ac, overhead can be reduced owing to the four-time increased structure in the time domain. Moreover, this method is also advantageous in that LTF overhead caused by multiple streams can be reduced.

Information for transmitting the HE-LTF per stream/user can be obtained according to the following methods.

The information for transmitting the HE-LTF for each stream/user may be received through the control frame/management frame/trigger frame/MAC header. In this case, the received information may include allocation information (e.g., a start point, a frequency offset, a tone interval, an allocation index, etc.), symbol index/number, HE-LTF information (e.g., a length, a sequence index, a shifting value, etc.) and the like. On the other hand, it may be sequentially assigned according to a numerical order predetermined for each stream/user without signaling information.

Although in the option 1, it is assumed that the two-tone interval is used, various tone intervals (e.g., three-tone interval, four-tone interval, etc.) can be used as described above.

<Option 2>

In option 2 shown in FIG. 11, HE-LTFs assigned for individual streams/users are sequentially loaded in one symbol and in a next symbol, the HE-LTFs are sequentially loaded by being spaced apart from the first symbol by a tone interval. That is, according to the option 2, an HE-LTF for a single stream/user is transmitted at a fixed tone interval in terms of total symbols where the HE-LTFs are transmitted.

When HE-LTFs for four streams are transmitted using the two-tone interval, the HE-LTFs for the individual streams are sequentially loaded in the first symbol according to the tone interval. In the next symbol, the HE-LTFs for the individual streams are sequentially loaded apart by the two-tone interval again. That is, in the next symbol, order of loading the HE-LTFs is cyclic-shifted by 2. According to the present method, the number of LTF symbols required for supporting multiple streams can be reduced compared to that in the 11ac.

Information for transmitting the HE-LTF for each stream/user can be obtained according to the following methods.

The information for transmitting the HE-LTF for each stream/user may be received through the control frame/management frame/trigger frame/MAC header. In this case, the received information may include the allocation information (e.g., the start point, the frequency offset, the tone interval, the allocation index, etc.), the symbol index/number, the HE-LTF information (e.g., the length, the sequence index, the shifting value, etc.) and the like.

On the other hand, it may be sequentially assigned using information on a number allocated for each stream/user.

<Option 3>

According to option 3, an HE-LTF for one stream/user is loaded in an OFDM/A symbol at the two-tone interval. In case of multi-stream/multi-user, an HE-LTF for another stream/user may be transmitted in the OFDM/A symbol using the P-matrix like the related art.

Although in the option 3, it is assumed that the two-tone interval is used, various tone intervals (e.g., one tone interval, four-tone interval, eight-tone interval, etc.) can be used as described above.

Figure 12:
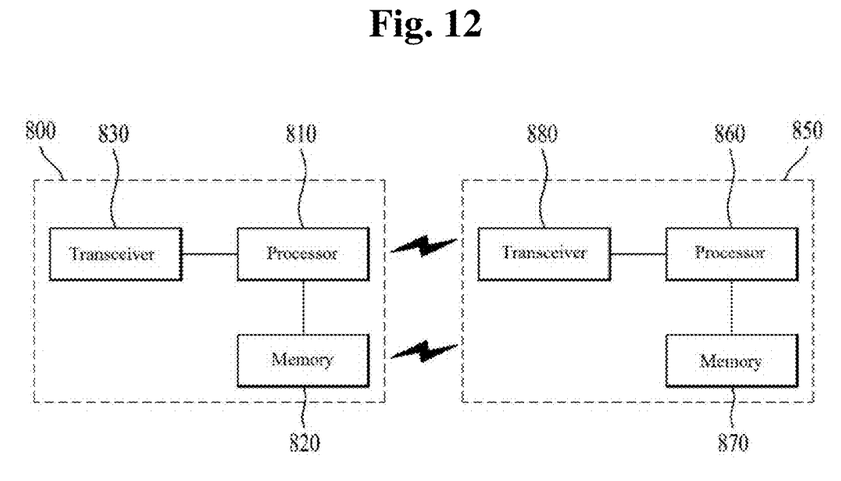
FIG. 12 is a diagram for explaining a device for implementing the aforementioned preamble transmission method.

FIG. 12 is a diagram for explaining a device for implementing the aforementioned preamble transmission method.

In FIG. 12, a wireless device 800 may correspond to the above-described STA1 and a wireless device 850 may correspond to the above-mentioned STA2/AP that receives the preamble.

The STA1 may include a processor 810, a memory 820, and a transceiver unit 830 and the STA2/AP, i.e., the wireless device 850 may include a processor 860, a memory 870, and a transceiver unit 880. The transceiver unit 830/880 may transmit/receive radio signals and be driven by a physical layer defined in IEEE 802.11/3GPP. The processor 810/860 may be driven by a physical layer and/or an MAC layer and connected to the transceiver unit 830/880. The processor 810/860 can perform the aforementioned interference control procedure.

The processor 810/860 and/or the transceiver unit 830/880 may include an application-specific integrated circuit (ASIC), a different chipset, a logic circuit, and/or a data processor. The memory 820/870 may include a read-only memory (ROM), a random access memory (RAM), a flash memory, a memory card, a storage medium, and/or other storage units. When an embodiment is executed by software, the above-described methods may be implemented as modules (e.g., processes, functions, etc.) for performing the aforementioned functions. The modules can be stored in the memory 820/870 and driven by the processor 810/860. In addition, the memory 820/870 can be provided within or outside the processor 810/860 and connected to the processor 810/860 by well-known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the present invention is described on the assumption that the invention is applied to the WLAN system based on IEEE 802.11, the invention is not limited thereto. The present invention can be applied to various wireless systems in the same manner.

What is claimed is:

1. A method for a first station (STA) to transmit a preamble in a wireless local area network (WLAN), the method comprising:
configuring a frame comprising a first part of the frame for a first type STA and a second part of the frame for a second type STA,
wherein the first type STA is a legacy STA in view of the second type STA,
wherein the first part of the frame comprises a STF (Short Training Field) for the first type STA and a LTF (Long Training Field) for the first type STA,
wherein the second part of the frame comprises a STF for the second type STA and a LTF for the second type STA,
wherein a first tone spacing between first tones in a frequency domain for the first part is M times larger than a second tone spacing between second tones in the frequency domain for the second part, the M being an inter greater than 1, and
wherein one or more of the STF for the second type STA and the LTF for the second type STA is configured:
by mapping each of components of a sequence for the one or more of the STF for the second type STA and the LTF for the second type STA in every N tones with an interval of N tones among the second tones in the frequency domain, and
by setting a remainder of the second tones, to which the components of the sequence are not mapped, to zero, the N being an integer representable as power of 2; and
transmitting the frame to a second STA.

2. The method of claim 1, wherein the N is differently determined based on a length of each symbol for the LTF for the second type STA in a time domain.

3. The method of claim 1, wherein the N is determined as one of 4, 2 or 1.

4. The method of claim 1, wherein the N is differently determined based on a length of the STF for the second type STA in a time domain.

5. A station (STA) configured to transmit a preamble in a wireless local area network (WLAN), the STA comprising:
a processor for configuring a frame comprising a first part of the frame for a first type STA and a second part of the frame for a second type STA,
wherein the first type STA is a legacy STA in view of the second type STA,
wherein the first part of the frame comprises a STF (Short Training Field) for the first type STA and a LTF (Long Training Field) for the first type STA,
wherein the second part of the frame comprises a STF for the second type STA and a LTF for the second type STA,
wherein a first tone spacing between first tones in a frequency domain for the first part is M times larger than a second tone spacing between second tones in the frequency domain for the second part, the M being an inter greater than 1, and
wherein one or more of the STF for the second type STA and the LTF for the second type STA is configured:
by mapping each of components of a sequence for the one or more of the STF for the second type STA and the LTF for the second type STA in every N tones with an interval of N tones among the second tones in the frequency domain, and
by setting a remainder of the second tones, to which the components of the sequence are not mapped, to zero, the N being an integer representable as power of 2; and
a transceiver for transmitting the frame to a second STA.

6. The STA of claim 5, wherein the N is differently determined based on a length of the LTF for the second type STA in a time domain.

7. The STA of claim 5, wherein the N is determined as one of 4, 2 or 1.

8. The STA of claim 5, wherein the N is differently determined based on a length of the STF for the second type STA in a time domain.

* * * * *